United States Patent
Gupte et al.

(10) Patent No.: US 8,757,722 B2
(45) Date of Patent: Jun. 24, 2014

(54) SEAT ASSEMBLY WITH EASY-ENTRY MECHANISM AND FOLD FLAT FEATURE

(75) Inventors: Ameya Gupte, Novi, MI (US); Jeffrey P. Carroll, West Bloomfield, MI (US)

(73) Assignee: Magna Seating Inc, Aurora, Ontario (CA)

( * ) Notice: Subject to any disclaimer, the term of this patent is extended or adjusted under 35 U.S.C. 154(b) by 135 days.

(21) Appl. No.: 13/570,335

(22) Filed: Aug. 9, 2012

(65) Prior Publication Data

US 2013/0043708 A1   Feb. 21, 2013

Related U.S. Application Data

(60) Provisional application No. 61/523,876, filed on Aug. 16, 2011.

(51) Int. Cl.
*B60N 2/02* (2006.01)
*B60N 2/48* (2006.01)

(52) U.S. Cl.
USPC .................................................. 297/378.12

(58) Field of Classification Search
USPC ............................ 297/378.12, 378.14, 367 R
See application file for complete search history.

(56) References Cited

U.S. PATENT DOCUMENTS

| | | | |
|---|---|---|---|
| 4,634,180 A | 1/1987 | Zaveri et al. | |
| 6,139,105 A * | 10/2000 | Morgos et al. | 297/378.12 |
| 6,464,299 B1 * | 10/2002 | Castagna | 297/378.12 |
| 6,739,668 B2 * | 5/2004 | Coman et al. | 297/378.12 |
| 6,869,143 B2 * | 3/2005 | Secord | 297/362 |
| 7,017,993 B2 | 3/2006 | Niimi et al. | |
| 7,025,419 B2 * | 4/2006 | Sasaki et al. | 297/344.11 |
| 7,172,253 B2 | 2/2007 | Haverkamp | |
| 7,204,556 B2 | 4/2007 | Schwerdtner et al. | |
| 7,503,099 B2 | 3/2009 | Pejathaya | |
| 7,517,022 B2 | 4/2009 | Habedank et al. | |
| 7,648,206 B2 | 1/2010 | Wieclawski | |
| 8,002,355 B2 * | 8/2011 | Kumazaki et al. | 297/378.12 |
| 8,585,145 B2 * | 11/2013 | Nock et al. | 297/341 |
| 2001/0040400 A1 * | 11/2001 | Kamida et al. | 297/354.13 |

* cited by examiner

*Primary Examiner* — Chi Q Nguyen
(74) *Attorney, Agent, or Firm* — Miller Canfield

(57) ABSTRACT

A seat assembly includes a recliner mechanism operatively coupled between a seat back and seat cushion to allow pivotal movement of the seat back. An easy-entry mechanism includes an easy-entry release lever, a drive link and a sector. Actuating the easy-entry lever in a first direction causes the drive link to pivot into engagement with the sector and simultaneously pivots a recliner release lever to unlock the recliner mechanism. As the seat back pivots forwardly, the drive link moves with the seat back and causes the sector to pivot in a second direction until the sector is blocked and the seat back is in a forwardly dumped position. Alternatively, actuating the recliner release lever in the first direction unlocks the recliner mechanism and the drive link moves with the seat back and passes by the sector as the seat back pivots to a fold flat position overlying the seat cushion.

7 Claims, 5 Drawing Sheets

SEAT ASSEMBLY WITH EASY-ENTRY MECHANISM AND FOLD FLAT FEATURE

RELATED APPLICATIONS

This application claims priority to and all the benefits of U.S. Provisional Application No. 61/523,876, filed Aug. 16, 2011, and entitled "Seat Assembly with Easy-Entry Mechanism and Fold Flat Feature".

BACKGROUND OF THE INVENTION

1. Field of the Invention

The present invention relates to a vehicle seat assembly. More particularly, the present invention relates to a vehicle seat assembly including a seat back pivotally coupled to a seat cushion by a recliner mechanism wherein the seat assembly includes an easy-entry mechanism to move the seat assembly to an easy-entry position and allows the seat back to fold flat against the seat cushion.

2. Description of Related Art

Automotive vehicles typically include one or more seat assemblies having a seat cushion and a seat back for supporting passengers above a vehicle floor. The seat assembly is commonly mounted to the vehicle floor by a seat track assembly for providing fore and aft adjustment of the seat assembly for passenger comfort. The seat back is also typically operatively coupled to the seat cushion by a recliner assembly for providing pivotal movement relative to the seat cushion. Further, it is common for the seat track assembly and the recliner assembly to be synchronized or linked together to allow the seat assembly to be adjusted to an easy-entry position. In the easy-entry position, the seat assembly is slid forward by the seat track assembly and the seat back is tilted forwardly to a dumped position to facilitate access or ingress behind the seat assembly.

In addition, it is often desired to have the seat back fold flat against the seat cushion to increase the cargo carrying capacity of the vehicle. However, conventional seat assemblies that are adjustable to an easy-entry position either do not additionally provide for a seat back that can be folded flat against a seat cushion or require overly complicated mechanisms for doing so.

Accordingly, there remains a need for a seat assembly having a simple mechanism for maintaining a seat back in a forwardly tilted position while the seat assembly is adjusted to an easy-entry position, and further allows the seat back to be adjusted to a fold flat position lying against the seat cushion.

SUMMARY OF THE INVENTION

According to one aspect of the invention, a seat assembly for an automotive vehicle includes a seat back operatively coupled to a seat cushion by a recliner mechanism allowing for pivotal movement between an upright seating position, a forwardly dumped position and a fold flat position overlying the seat cushion. A release shaft is rotatably coupled to the recliner mechanism for actuating the recliner mechanism between locked and unlocked conditions. A recliner release lever is fixedly secured to the release shaft wherein pivoting the recliner release lever in a first direction actuates the recliner mechanism from the locked condition to the unlocked condition. An easy-entry release lever is pivotally coupled to the release shaft and includes a first arm having a drive pin and a second arm having a release pin. A drive link is pivotally coupled to the seat back and includes a catch pin. A sector is also pivotally coupled to the release shaft and includes first and second legs having a recess therebetween. Actuating the easy-entry release lever in the first direction causes the drive pin to engage and pivot the drive link in the first direction thereby moving the catch pin into the recess of the sector. Simultaneously, the release pin engages and pivots the recliner release lever in the first direction thereby actuating the recliner mechanism from the locked condition to the unlocked condition allowing forward pivotal movement of the seat back. As the seat back pivots forwardly from the upright seating position, the drive link moves with the seat back and the catch pin engages the first leg of the sector thereby causing the sector to pivot in a second direction, opposite the first direction, until the sector is blocked and the seat back is in the forwardly dumped position. Alternatively, actuating the recliner release lever in the first direction actuates the recliner mechanism from the locked condition to the unlocked condition allowing forward pivotal movement of the seat back. As the seat back pivots forwardly from the upright seating position, the drive link moves with the seat back and the catch pin passes by the first leg of the sector allowing the seat back to pivot to the fold flat position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
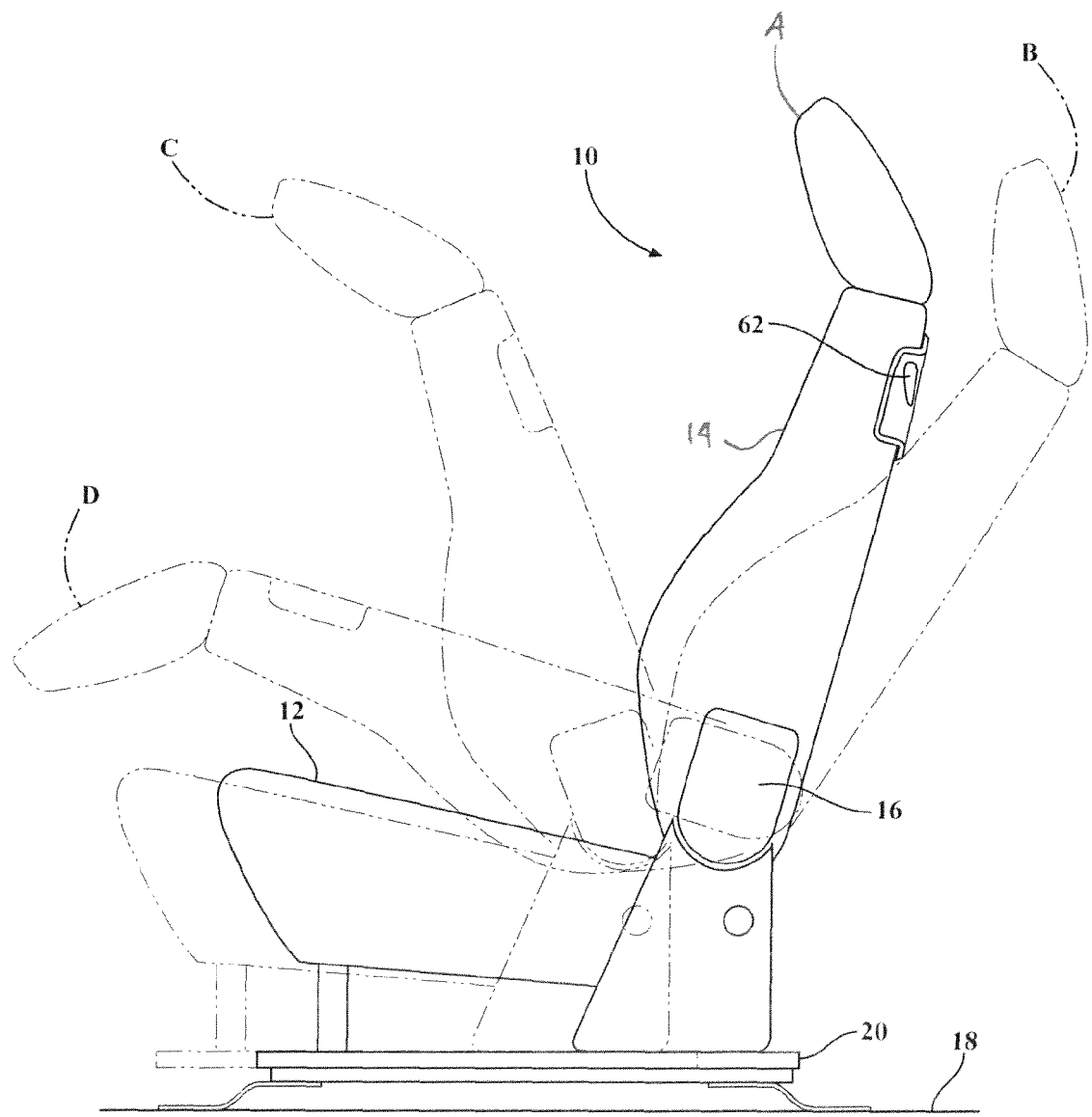
FIG. 1 is a side view of a vehicle seat assembly illustrating a seat back in an upright seating position, a reclined seating position, a forwardly dumped position corresponding with an easy-entry position of the seat assembly, and a fold flat position.
Figure 2:
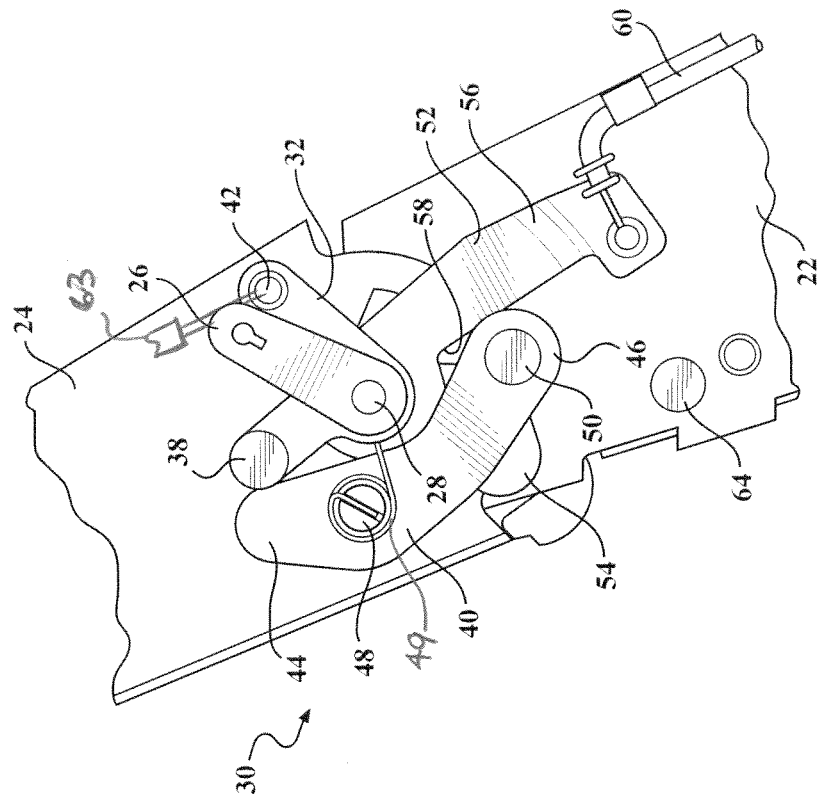
FIG. 2 is a side view of an easy-entry mechanism according to a first embodiment of the invention.

Referring to the Figures, wherein like numerals indicate like or corresponding parts throughout the several views, a seat assembly for use in an automotive vehicle is generally shown at 10. Referring to FIG. 1, the seat assembly 10 includes a generally horizontal seat cushion 12 and a generally upright seat back 14 for supporting a seat occupant. The seat back 14 is operatively coupled to the seat cushion 12 by a recliner mechanism 16 for providing pivotal movement between an upright seating position A, a plurality of reclined positions, one of which is shown at B, a forwardly dumped position C, and a fold flat position D overlying the seat cushion 12. The recliner mechanism 16 generally includes a pair of spaced apart and synchronized disc recliners (not shown), as is well known in the art. The seat cushion 12 is mounted to a floor 18 of the vehicle by a seat track assembly 20 having a pair of seat tracks to provide fore and aft adjustment of the seat assembly 10.

Referring to FIGS. 2 through 10, the seat assembly 10 includes a pair of B-brackets 22 fixedly secured to the seat cushion 12 and a pair of A-brackets 24 fixedly secured to the seat back 14. The A-brackets 24 are operatively coupled to the B-brackets 22 by the recliner mechanism 16. On one side of the seat assembly 10, a recliner release lever 26 is fixedly secured to a release shaft 28 that is rotatably coupled to the recliner mechanism 16 for actuating the recliner mechanism 16 between a locked condition and an unlocked condition. The recliner mechanism 16 is normally biased to the locked condition. In the locked condition, the recliner mechanism 16 prevents pivotal movement of the seat back 14 relative to the seat cushion 12. In the unlocked condition, the recliner mechanism 16 allows pivotal movement of the seat back 14 relative to the seat cushion 12. Pivoting the recliner release lever 26 in a first direction (counterclockwise when viewed from the Figures) rotates the release shaft 28 in the counterclockwise direction, thereby actuating the recliner mechanism 16 from the locked condition to the unlocked condition.

The seat assembly 10 also includes an easy-entry mechanism 30 for moving the seat assembly 10 to an easy-entry position and allowing pivotal movement of the seat back 14 to the fold flat position D. The easy-entry mechanism 30 includes an easy-entry release lever 32 that is generally L-shaped and includes a first arm 34 and a second arm 36. The easy-entry release lever 32 is coupled between the first and second arms 34, 36 to the release shaft 28 and pivots freely thereon. The easy-entry release lever 32 is disposed inboard of the recliner release lever 26. A drive pin 38 at a distal end of the first arm 34 extends laterally toward the A-bracket 24 and is adapted for engagement with a drive link 40, as is described below in detail. A release pin 42 at a distal end of the second arm 36 extends laterally away from the A-bracket 24 and is adapted for engagement with the recliner release lever 26.

The drive link 40 extends between a first end 44 and a second end 46 and is pivotally coupled to the A-bracket 24 between the first and second ends 44, 46 at pivot 48. The drive link 40 is spring biased in a second direction (clockwise when viewed from the Figures) by clock spring 49 such that the first end 44 is normally biased against the drive pin 38 on the easy-entry release lever 32. A catch pin 50 is disposed at the second end 46 of the drive link 40 and extends laterally toward the B-bracket 22.

A sector 52 is generally V-shaped and includes a first leg 54 and a second leg 56 defining a recess 58 therebetween. The recess 58 is selectively engaged by the catch pin 50 on the drive link 40. The sector 52 is coupled between the first and second legs 54, 56 to the release shaft 28 and pivots freely thereon. The sector 52 is disposed inboard of the easy-entry release lever 32. A track release cable 60 is operatively coupled between a distal end of the second leg 56 and the seat track assembly 20 for unlocking the seat track assembly 20 to allow forward sliding movement of the seat assembly 10, as is described below in detail.

The seat back 14 is normally in the upright seating position A and the seat occupant can actuate the recliner release lever 26 in the counterclockwise direction to rotate the release shaft 28 in the counterclockwise direction, thereby actuating the recliner mechanism 16 from the locked condition to the unlocked condition. In the unlocked condition, the seat back 14 can be pivotally adjusted between the upright seating position A and the plurality of reclined seating positions B and once the desired position is selected the recliner release lever 26 is released to allow the recliner mechanism 16 to automatically return to the locked condition, as is well known in the art.

Figure 3:
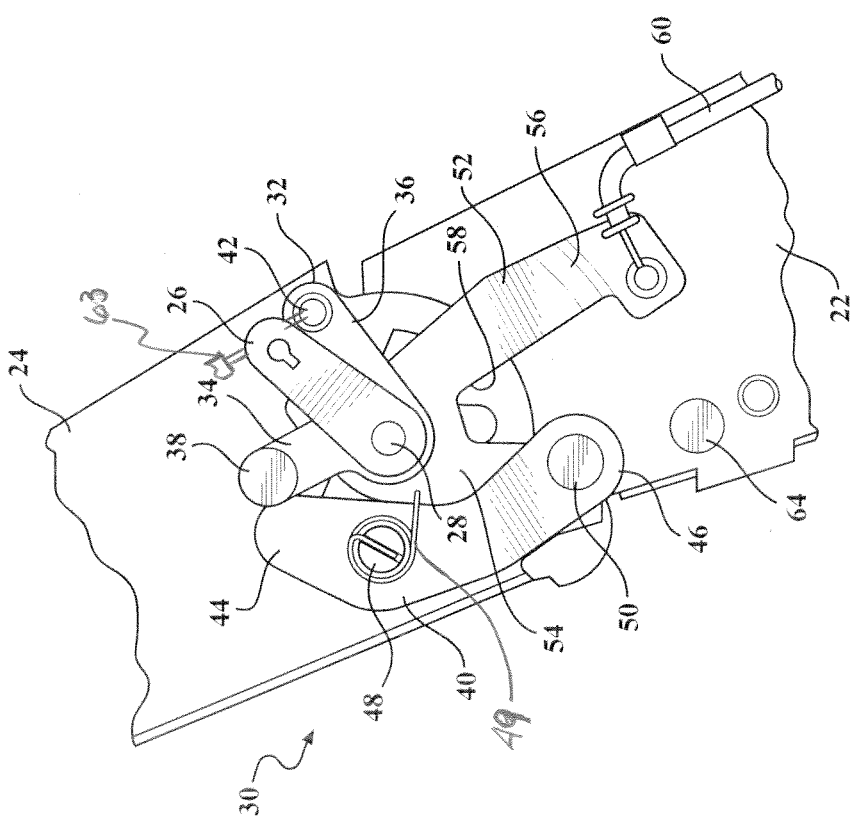
FIG. 3 is a side view of the easy-entry mechanism illustrating an easy-entry release lever in an actuated position.
Figure 4:
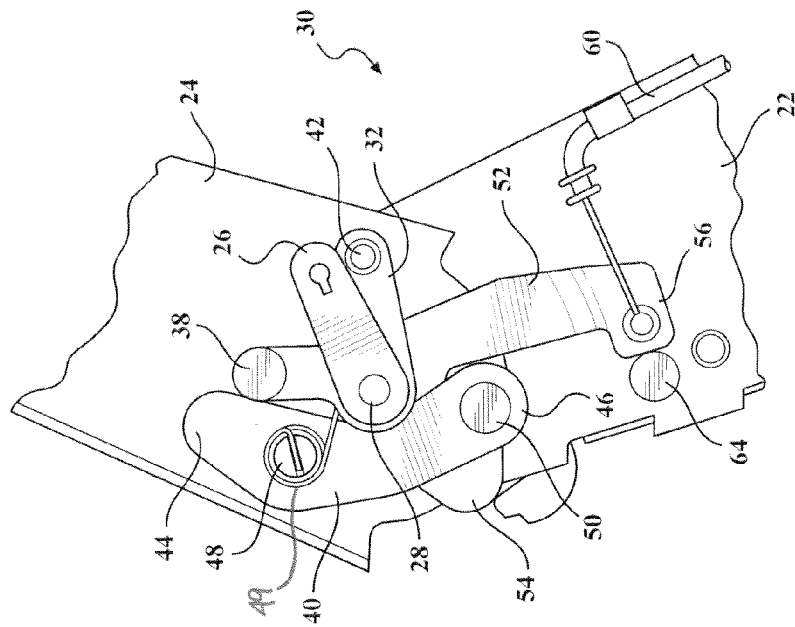
FIG. 4 is a side view of the easy-entry mechanism illustrating a drive link engaging a sector as the seat back pivots forwardly.
Figure 5:
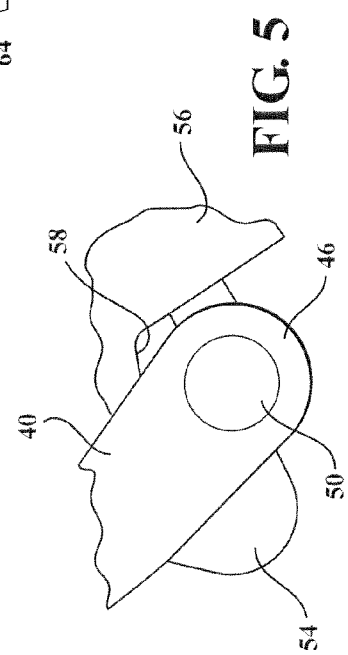
FIG. 5 is a close-up side view of the drive link engaging the sector.
Figure 6:
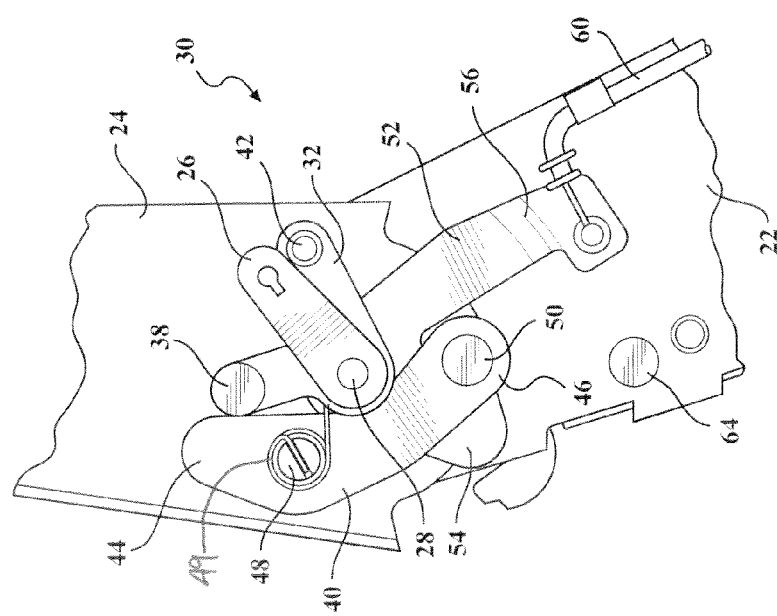
FIG. 6 is a side view of the easy-entry mechanism illustrating a stop pin blocking the sector with the seat back in the forwardly dumped position.

In an easy-entry mode, the seat occupant is typically standing beside the seat assembly 10 and actuates a seat back handle or easy-entry lever 62 which is operatively coupled to the easy-entry release lever 32 by an easy-entry cable 63. Actuating the easy-entry lever 62 causes the easy-entry release lever 32 to pivot on the release shaft 28 in the counterclockwise direction, as shown in FIG. 3. As the easy-entry release lever 32 pivots in the counterclockwise direction, the drive pin 38 engages the first end 44 of the drive link 40 and pivots the drive link 40 about the pivot 48 in the counterclockwise direction which moves the catch pin 50 into the recess 58 of the sector 52. Simultaneously, the release pin 42 on the easy-entry release lever 32 engages the recliner release lever 26 and pivots the recliner release lever 26 in the counterclockwise direction, thereby actuating the recliner mechanism 16 from the locked condition to the unlocked condition. In the unlocked condition, the seat back 14 can be pivotally adjusted from the upright seating position A or one of the reclined seating positions B to the forwardly dumped position C. It is appreciated that the seat back 14 may be biased toward the forwardly dumped position C without varying from the scope of the invention. As the seat back 14 pivots forwardly, the drive link 40 moves with the seat back 14 and the catch pin 50 engages the first leg 54 of the sector 52 and causes the sector 52 to pivot about the release shaft 28 in the clockwise direction, as shown in FIGS. 4 and 5. The seat back 14 will continue to pivot forwardly until the distal end of the second leg 56 of the sector 52 abuts a stop pin 64 extending laterally from the B-bracket 22, thereby blocking the seat back 14 in the forwardly dumped position C, as shown in FIG. 6. In addition, as the sector 52 pivots in the clockwise direction, the second leg 56 pulls the track release cable 60 and unlocks the seat track assembly 20 such that the seat assembly 10 can be moved to a forward most position along the seat tracks. With the seat back 14 in the forwardly dumped position C and the seat assembly 10 in the forward most position along the seat tracks, the seat assembly 10 is in the easy-entry position allowing access behind the seat assembly 10. It is appreciated that the seat assembly 10 may be biased to the forward most position along the seat tracks without varying from the scope of the invention.

Figure 8:
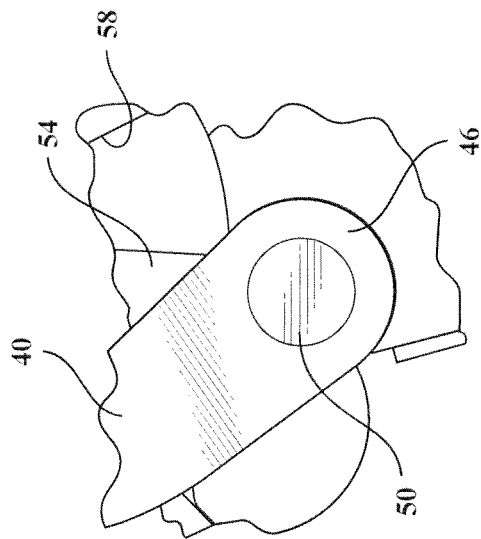
FIG. 8 is close-up side view of the drive link passing under the sector.
Figure 7:
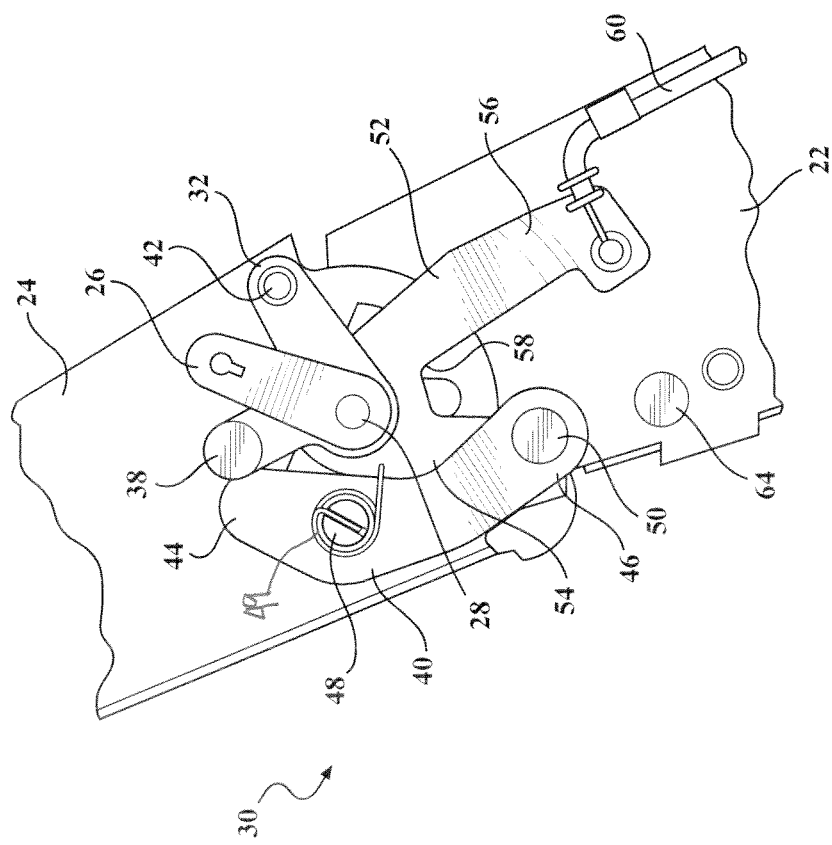
FIG. 7 is a side view of the easy-entry mechanism illustrating a recliner release lever in an actuated position.
Figure 10:
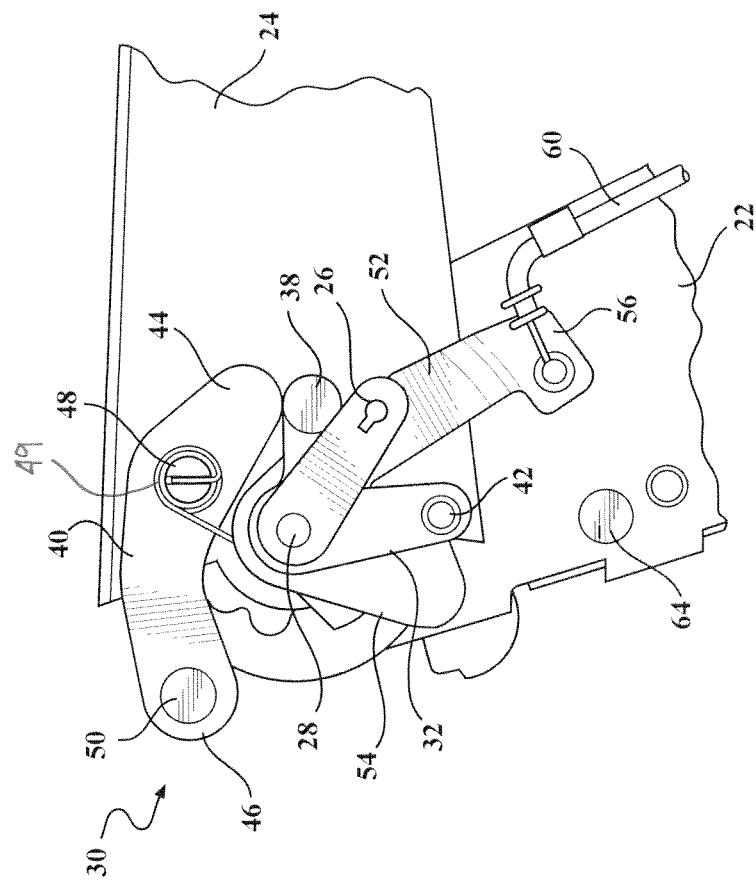
FIG. 10 is a side view of the easy-entry mechanism with the seat back in the fold flat position.
Figure 9:
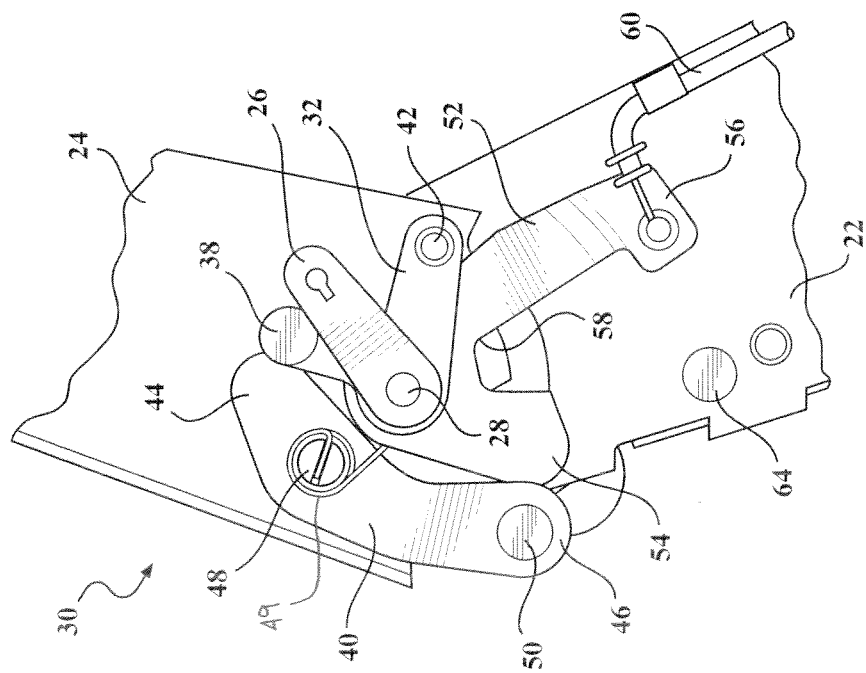
FIG. 9 is a side view of the easy-entry mechanism illustrating the drive link disengaged from the sector and the seat back pivoting forwardly.

In a fold-flat mode, the seat occupant is again typically standing beside the seat assembly 10 and actuates the recliner release lever 26 in the counterclockwise direction to rotate the release shaft 28 in the counterclockwise direction, as shown in FIG. 7, thereby actuating the recliner mechanism 16 from the locked condition to the unlocked condition. In the unlocked condition, the seat back 14 can be pivotally adjusted forwardly from the upright seating position A or one of the reclined seating positions B to the fold flat position D overlying the seat cushion 12, as shown in FIG. 10. The sector 52 is not actuated as the seat back 14 pivots forwardly to the fold flat position D. More specifically, as the seat back 14 pivots forwardly, the drive link 40 moves with the seat back 14 and the catch pin 50 passes by the distal end of the first leg 54 of the sector 52 such that the sector 52 does not pivot, as shown in FIGS. 8 and 9, which prevents unlocking of the seat track assembly 20. In addition, as the drive link 40 moves with the seat back 14, the first end 44 abuts the drive pin 38 on the easy-entry release lever 32 and causes the easy-entry release lever 32 to freely pivot in the clockwise direction on the release shaft 28 thereby preventing actuation of the easy-entry mechanism 30. It is appreciated that with the seat back 14 in the fold flat position D, the cargo carrying capacity of the vehicle is increased.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A seat assembly including a seat back operatively coupled to a seat cushion for pivotal movement between an upright seating position, a forwardly dumped position and a fold flat position overlying the seat cushion, said seat assembly comprising:
    a recliner mechanism adapted for operatively coupling the seat back and the seat cushion and providing selective pivotal movement therebetween;
    a release shaft rotatably coupled to said recliner mechanism for actuating said recliner mechanism between a locked condition preventing pivotal movement of the seat back and an unlocked condition allowing pivotal movement of the seat back;
    a recliner release lever fixedly secured to said release shaft, wherein pivoting said recliner release lever in a first direction actuates said recliner mechanism from said locked condition to said unlocked condition;
    an easy-entry release lever pivotally coupled to said release shaft, said easy-entry release lever including a first arm having a drive pin and a second arm having a release pin;
    a drive link adapted to be pivotally coupled to the seat back, said drive link including a catch pin; and
    a sector pivotally coupled to said release shaft, said sector including a first leg and a second leg, wherein said first and second legs define a recess therebetween;
    wherein actuating said easy-entry release lever in said first direction causes said drive pin to engage and pivot said drive link in said first direction thereby moving said catch pin into said recess of said sector, and wherein actuating said easy-entry release lever in said first direction simultaneously causes said release pin to engage and pivot said recliner release lever in said first direction thereby actuating said recliner mechanism from said locked condition to said unlocked condition allowing forward pivotal movement of the seat back from the upright seating position, said drive link moving with the seat back and said catch pin engaging said first leg of said sector thereby causing said sector to pivot in a second direction, opposite said first direction, until said sector is blocked and the seat back is in the forwardly dumped position;
    wherein actuating said recliner release lever in said first direction actuates said recliner mechanism from said locked condition to said unlocked condition allowing forward pivotal movement of the seat back from the upright seating position, said drive link moving with the seat back and said catch pin passing by said first leg of said sector allowing the seat back to pivot to the fold flat position.

2. A seat assembly as set forth in claim 1 wherein said drive link includes a first end for engagement with said drive pin on said easy entry release lever and an opposite second end supporting said catch pin for selective engagement with said recess in said sector.

3. A seat assembly as set forth in claim 2 wherein said drive link pivotally coupled to said seat back by a pivot and including a spring for biasing said first end of said drive link against said drive pin of said easy entry release lever.

4. A seat assembly as set forth in claim 3 further including a seat track assembly coupled to said seat cushion for providing fore and aft sliding movement of said seat assembly.

5. A seat assembly as set forth in claim 4 further including a track release cable operatively coupled between said second leg of said sector and said seat track assembly for actuating and unlocking said seat track assembly allowing said sliding movement in response to pivotal movement said seat back to said forwardly dumped position and pivotal movement of said sector in said first direction.

6. A seat assembly as set forth in claim 5 further including a stop pin projecting from said seat cushion for engagement with said second leg of said sector to limit pivotal movement of said seat back in said forwardly dumped position.

7. A seat assembly as set forth in claim 6 further including an easy entry lever coupled to said seat back for actuating said easy entry release lever and a easy entry cable coupled between said easy entry lever and said easy entry release lever for pivoting said easy entry release lever in said first direction in response to actuation of said easy entry lever.

* * * * *